US009440412B2

(12) United States Patent
Didier et al.

(10) Patent No.: US 9,440,412 B2
(45) Date of Patent: Sep. 13, 2016

(54) FIRE-PROOF ILLUMINATING WEB, FIRE-PROOF ILLUMINATING STRUCTURE, THEIR MANUFACTURING PROCESSES AND THEIR USE

(71) Applicant: SAINT-GOBAIN PLACO, Suresnes (FR)

(72) Inventors: Benoit Didier, Courbevoie (FR); Maud Sarrant-Foresti, Paris (FR)

(73) Assignee: SAINT-GOBAIN PLACO, Suresnes (FR)

( * ) Notice: Subject to any disclaimer, the term of this patent is extended or adjusted under 35 U.S.C. 154(b) by 0 days.

(21) Appl. No.: 14/365,760

(22) PCT Filed: Dec. 17, 2012

(86) PCT No.: PCT/FR2012/052955
§ 371 (c)(1),
(2) Date: Jun. 16, 2014

(87) PCT Pub. No.: WO2013/088094
PCT Pub. Date: Jun. 20, 2013

(65) Prior Publication Data
US 2014/0355294 A1    Dec. 4, 2014

(30) Foreign Application Priority Data

Dec. 16, 2011  (FR) ...................................... 11 61827
Apr. 11, 2012  (FR) ...................................... 12 53298

(51) Int. Cl.
*G02B 5/02*    (2006.01)
*B32B 5/02*    (2006.01)
(Continued)

(52) U.S. Cl.
CPC ................. *B32B 5/024* (2013.01); *B32B 5/26* (2013.01); *B32B 17/02* (2013.01);
(Continued)

(58) Field of Classification Search
CPC .............. B32B 17/02; B32B 2255/02; B32B 2255/20; B32B 2262/101; B32B 2264/12; B32B 2307/3065; B32B 2307/40; B32B 2607/00; B32B 2607/02; B32B 5/024; B32B 5/26; F21S 8/04; F21V 15/00
See application file for complete search history.

(56) References Cited

U.S. PATENT DOCUMENTS

2004/0202850 A1   10/2004  Hayashi et al.
2009/0291606 A1   11/2009  Malhomme et al.
(Continued)

FOREIGN PATENT DOCUMENTS

CN    2476582 Y    2/2002
FR    2 907 194    4/2008
(Continued)

OTHER PUBLICATIONS

Machine English language translation of WO 2008/125339 A1.*
(Continued)

*Primary Examiner* — Tracie Y Green
(74) *Attorney, Agent, or Firm* — Oblon, McClelland, Maier & Neustadt, L.L.P.

(57) ABSTRACT

The invention relates to an illuminating web, characterized in that it is flame-retarded by a flame-retardant composition impregnated into the bulk of the illuminating web and/or included in a coating on at least one face of the illuminating web. The illuminating web exhibits an improved performance in terms of reaction toward fire. It is better suited to the standards in force as regards reaction to fire. It also exhibits an advantageous illuminating performance and has good acoustic properties, when it incorporates a support appropriate for sound insulation. The invention also relates to an illuminating structure composed of said web added to a rigid or semirigid support. This structure can be used in particular as partition wall or ceiling in a building. With regard to the web proper, it can be used as painter's canvas or stretched fabric or part of these.

28 Claims, 1 Drawing Sheet

(51) Int. Cl.
| | |
|---|---|
| *B32B 17/02* | (2006.01) |
| *D03D 1/00* | (2006.01) |
| *D03D 15/00* | (2006.01) |
| *D06M 15/356* | (2006.01) |
| *F21V 8/00* | (2006.01) |
| *G02B 6/04* | (2006.01) |
| *D06N 3/00* | (2006.01) |
| *B32B 5/26* | (2006.01) |
| *D06M 15/19* | (2006.01) |
| *F21S 8/04* | (2006.01) |
| *F21V 15/00* | (2015.01) |
| *C03C 25/10* | (2006.01) |

(52) U.S. Cl.
CPC ....... *C03C 25/1095* (2013.01); *D03D 1/0035* (2013.01); *D03D 15/00* (2013.01); *D03D 15/0011* (2013.01); *D06M 15/19* (2013.01); *D06M 15/3564* (2013.01); *D06N 3/0006* (2013.01); *D06N 3/0056* (2013.01); *F21S 8/04* (2013.01); *F21V 15/00* (2013.01); *G02B 6/001* (2013.01); *G02B 6/04* (2013.01); *B32B 2255/02* (2013.01); *B32B 2255/20* (2013.01); *B32B 2262/101* (2013.01); *B32B 2264/12* (2013.01); *B32B 2307/3065* (2013.01); *B32B 2307/40* (2013.01); *B32B 2607/00* (2013.01); *B32B 2607/02* (2013.01); *D06M 2200/30* (2013.01); *D06N 2209/067* (2013.01); *D06N 2211/063* (2013.01); *D10B 2401/20* (2013.01); *G02B 6/0025* (2013.01); *G02B 6/0065* (2013.01)

(56) References Cited

U.S. PATENT DOCUMENTS

| | | |
|---|---|---|
| 2010/0046246 A1 | 2/2010 | Bihr et al. |
| 2010/0053990 A1 | 3/2010 | Brochier et al. |

FOREIGN PATENT DOCUMENTS

| | | |
|---|---|---|
| JP | 2008-55767 | 3/2008 |
| NZ | 248978 | 10/1994 |
| RU | 2 179 469 | 2/2002 |
| WO | WO 2008/125339 A2 | 10/2008 |

OTHER PUBLICATIONS

International Search Report issued Feb. 22, 2013, in PCT/FR12/052955 filed Dec. 17, 2012.
Eurasian Office Action issued Apr. 1, 2016 in Application No. 201491201 filed Dec. 17, 2012.

* cited by examiner

FIRE-PROOF ILLUMINATING WEB, FIRE-PROOF ILLUMINATING STRUCTURE, THEIR MANUFACTURING PROCESSES AND THEIR USE

The present invention relates to illuminating webs which can be used as or as component of a painter's canvas or of a stretched fabric and illuminating structures, in particular illuminating panels which can be used as partition wall or as ceiling in a building.

Illuminating fabrics are a technology known in the state of the art. French patent application FR 2 859 737 describes in particular a fabric composed of a bundle of optical fibers woven together so as to form a Jacquard pattern, and all connected to the same light source. Such a fabric has attractive optical properties and an attractive visual appearance.

It is particularly advantageous to incorporate these illuminating fabrics in the structure elements of a building or of a motor vehicle, for example in a partition wall or a ceiling of a building or vehicle. From this viewpoint, French patent application FR 2 907 194 describes an illuminating complex comprising a web of optical fibers woven together and combined with binding threads. The web is applied using an adhesive bonding means to a rigid support. Application FR 2 907 194 describes in particular the example of a fabric composed of optical fibers which have a polycarbonate core and of ground threads made of polyester which is flame-retarded and which is adhesively bonded to a rigid metal support. The illuminating structure thus formed is classified as M1 for behavior toward fire, according to French standards NF P 92 501 and P 92 502.

The entry into force of European standard EN 13501 for reaction toward fire has introduced major changes in comparison with the French standard. The European standard includes strict energy criteria, such as the rate of heat release or the total energy given off over a combustion test. These new criteria can result in the downgrading of some products hitherto having a high classification according to the French standard. This is particularly true for products which comprise a not insignificant percentage of organic matter. The illuminating structure described in the application FR 2 907 194 in fact comprises a large amount of organic matter, in particular in the optical fibers and the ground and binding threads made of plastic. Such a structure can thus prove to be unsuitable in meeting the European standards.

It is thus important to design novel illuminating structures based on illuminating fabric exhibiting an improved performance in terms of reaction toward fire in comparison with the known structures. These novel structures must in particular be able to satisfy the standard EN 13501, in particular so as to obtain an A or B classification in this standard.

A subject matter of the present invention is thus an illuminating web, characterized in that it is flame-retarded by a flame-retardant composition impregnated into the bulk of the illuminating web and/or included in a coating on at least one face of the illuminating web. The illuminating web can be textile or non-textile.

The nontextile illuminating web is, for example, an illuminating web made of material at least partly organic, a light-emitting organic film, a web comprising organic light-emitting diodes (OLEDs), or a luminescent film.

The illuminating web can also a woven or nonwoven textile web.

The illuminating textile web, also known as illuminating fabric, is in particular a textile web comprising warp- and/or weft-woven optical fibers which are capable of emitting light laterally with respect to the longitudinal axis of the fibers. It is, for example, of the type of those described in French patent applications FR 2 859 737 and FR 2 907 194. This textile web can also comprise other threads, such as ground threads, forming a textile framework, and binding threads, which make it possible to bind the ground threads to the textile fibers.

The term "flame-retardant composition" is understood to mean a composition which has flame-retardancy properties, that is to say a composition which makes it possible to inhibit or to delay the ignition of the underlying material when the latter is subjected to excessive heat and/or to slow down the propagation of a flame in the material.

The illuminating web of the invention exhibits an improved performance in reaction toward fire in comparison with the known webs and in particular a lower ignition time, a lower rate of heat release and more generally a lower emission of thermal energy in a combustion.

Furthermore, the flame-retardant composition of the invention makes it possible not to damage the acoustic insulation properties, which proves to be particularly advantageous when the web is used in an illuminating partition wall or in an illuminating ceiling in a building.

The flame-retardant composition is preferably included in a flame-retarded coating on at least one face of the illuminating web, being provided in particular in the form of one or more layers of flame-retardant varnish.

The flame-retardant composition is advantageously present in an amount of 100 to 350 g/m$^2$, preferably of 200 to 300 g/m$^2$.

The flame-retardant composition may have been deposited by application of a varnish, for example a commercially available varnish, such as the intumescent varnish available from Iris Vernici under the name of Char17 or the intumescent varnish available from Flame Seal under the name of FX-100 Fire Protective Coating, preferably used as a mixture with a curing agent, such as the curing agent T50 (melamine resin).

Advantageously, the flame-retardant composition is such that it does not significantly damage the emission of the illuminating surface, the loss of luminance due to the coating, measured at the normal with respect to the emitting surface, being in particular less than 30%, preferably 10% and more preferably 5%. This result is in particular obtained by adapting the index properties of the varnish when the composition is in the form of a varnish.

The web is thus advantageous in terms of optical properties. This illuminating performance is retained in terms of luminance emitted and a total flux emitted. When the web is at rest, the overall visual appearance of the web is also retained.

The flame-retardant composition comprises at least one flame-retardant agent chosen from phosphorus-comprising compounds, halogen-comprising compounds and inorganic fillers. In addition, it is advantageously intumescent, in particular comprising at least one intumescent agent consisting of a composition comprising at least one hydroxyl-comprising compound, at least one phosphorus-comprising compound and at least one blowing agent, for example a nitrogen-comprising compound. It can also comprise aluminum particles. Particulars concerning these specific characteristics relating to the flame-retardant and intumescent agents and to the aluminum particles are given below with reference to the description of the interpolated flame-retardant coating.

Another subject matter of the present invention is an illuminating structure comprising an illuminating web as defined above added to a rigid or semirigid support, said illuminating web being flame-retarded by a flame-retardant composition impregnated into the bulk of the illuminating web and/or included in a coating on the free face of the illuminating web.

The free face of the illuminating web, also known as front face, is the face directed toward the illumination space, for example toward the illuminated room in the event of use as partition wall or ceiling of a building. The back face is the face facing the rigid or semirigid support.

The rigid or semirigid support can be any support appropriate for the use of the illuminating structure. It can in particular consist of a building material when the structure is intended to form part of a building. Use will then preferably be made of a support having good acoustic properties and good properties of reaction toward fire. The support can in particular be a plasterboard or a board of material at least partly inorganic which can be used as suspended ceiling tile, or a support based on mineral wool, such as glass wool or rock wool.

In a specific embodiment, the illuminating structure comprises an interpolated flame-retardant coating interposed between the illuminating web and the rigid or semirigid support.

The interpolated flame-retardant coating may in particular have been applied in the form of one or more layers of paint or varnish on the face of the illuminating web facing the rigid or semirigid support.

In an alternative form, the illuminating structure can comprise an interpolated textile web, woven or nonwoven, interposed between the illuminating web and the rigid or semirigid support, and the interpolated flame-retardant coating may have been applied to a face of the interpolated textile web.

The interpolated flame-retardant coating is preferably provided in the form of one or more layers of flame-retardant paint.

The interpolated flame-retardant coating preferably exhibits an albedo of greater than 80. Particularly preferably, the interpolated flame-retardant coating is a white paint.

In this way, the absorption by the interpolated flame-retardant coating of the light emitted by the luminous fabric is minimized, which makes it possible to increase the intensity of illumination and/or to reduce the consumption of electrical energy.

The interpolated flame-retardant coating can be present in an amount of 50 to 300 $g/m^2$, preferably of 150 to 250 $g/m^2$.

The intumescent coating can comprise at least one flame-retardant agent chosen from phosphorus-comprising compounds, halogen-comprising compounds or inorganic fillers.

The phosphorus-comprising compounds are chosen in particular from compounds comprising a phosphate, phosphonate or phosphinate group, for example from phosphate, polyphosphate, phosphonate, polyphosphonate, phosphinate or polyphosphinate salts. They can also be chosen from organophosphorus compounds, such as trialkyl phosphates, chosen in particular from triethyl phosphate, tributyl phosphate, trioctyl phosphate or tributoxyethyl phosphate, or aryl phosphates, chosen in particular from tricresyl phosphate, diaryl alkyl phosphates or triaryl phosphates.

The halogen-comprising compounds are chosen in particular from bromine-comprising compounds, such as aluminum bromide or polybromodiphenyl ethers, or chlorine-comprising compounds, such as zinc chloride.

The inorganic fillers are chosen in particular from metal hydroxides, such as aluminum hydroxides, in particular aluminum monohydroxide or aluminum trihydroxide, and magnesium hydroxides, such as magnesium dihydroxide.

The interpolated flame-retardant coating comprises in particular from 10% to 40% by weight, preferably from 20% to 30% by weight, of inorganic fillers.

In a specific embodiment, the interpolated flame-retardant coating is intumescent, in particular comprises at least one intumescent agent consisting of a composition comprising at least one hydroxyl-comprising compound, at least one phosphorus-comprising compound and at least one blowing agent, for example a nitrogen-comprising compound.

The term "intumescent" is understood to mean that the composition or the coating is capable of undergoing an expansion in the event of exposure to excessive heat.

The hydroxyl-comprising compounds are chosen in particular from sorbitol or polyhydric alcohols, such as pentaerythritol or dipentaerythritol.

The phosphorus-comprising compounds are chosen in particular from ammonium phosphates, such as ammonium polyphosphate.

The nitrogen-comprising compounds are chosen in particular from melamine and its derivatives, dicyandiamide or urea. The melamine derivatives are in particular melamine phosphates, such as melamine monophosphate, melamine pyrophosphate or melamine polyphosphate.

The illuminating web can be attached directly or indirectly to the rigid or semirigid support by means of an adhesive.

Advantageously, the adhesive exhibits good flame-retardancy properties. It can be based on a compound chosen from silicates, silicone, polyester or poly(vinyl acetate).

The adhesive can in particular be a commercially available adhesive, such as the Promacol adhesives available from Promat, the Fireseal adhesives available from Simson or the Dion Fr adhesives available from Reichhold.

In a specific embodiment, the adhesive comprises at least one flame-retardant agent, preferably chosen from inorganic fillers, in particular from aluminum hydroxides, such as aluminum trihydroxide or aluminum monohydroxide, and from magnesium hydroxides, such as magnesium dihydroxide.

The adhesive comprises in particular from 10% to 40% by weight, preferably from 20% to 30% by weight, of inorganic fillers.

The presence of a flame-retardant agent and in particular of an inorganic filler in the adhesive makes it possible to reinforce the properties of reaction toward fire of the illuminating structure. Surprisingly, the addition of a flame-retardant agent, such as an inorganic filler, to the adhesive has a synergistic effect, in terms of reaction toward fire, with the flame-retardant composition included in a coating on the illuminating web and/or impregnating the latter. The addition of a flame-retardant agent also has a synergistic effect when it is combined with an interpolated flame-retardant coating applied on the back face of the illuminating web.

The illuminating structure can also comprise aluminum particles. The latter are, for example, incorporated in the interpolated flame-retardant coating and/or in the adhesive by mixing in the bulk of the interpolated flame-retardant coating and/or of the adhesive. The aluminum particles may also have been spread over the interpolated flame-retardant coating and/or over the intermediate adhesive layer, after application of the interpolated flame-retardant coating and/or of the intermediate adhesive layer.

It should be noted that the various embodiments described above can be combined by a person skilled in the art. By way of example, the illuminating structure can simultaneously comprise a flame-retardant composition impregnating the illuminating web and/or included in the coating on the front face of the illuminating web, an interpolated flame-retardant coating on the back face of the illuminating web and a flame-retardant agent, for example an inorganic filler, in the adhesive layer interposed between the illuminating web and the rigid or semirigid support.

The invention also relates to a process for the manufacture of an illuminating web as defined above or of an illuminating structure as defined above, characterized in that it comprises a stage of application of a flame-retardant composition into the bulk and/or onto at least one face of an illuminating web added to a rigid or semirigid support in order to obtain the flame-retarded illuminating web, said illuminating web comprising a flame-retardant composition in the bulk and/or on a face of an illuminating web which may have been added, via its other face, to a rigid or semirigid support, in which case said illuminating structure is obtained.

The illuminating web can be of the various types described in this patent application. It can in particular be an illuminating textile web comprising warp- and/or weft-woven optical fibers which are capable of emitting light laterally with respect to the longitudinal axis of the fibers.

It is possible to apply the flame-retardant composition by impregnation into the bulk of the illuminating web. It is possible to apply the flame-retardant composition as a coating, according to any deposition process, of a liquid composition conventionally known to a person skilled in the art, in particular by padding, dipping, drying, coating, spraying, with a brush or with a roll.

It is possible in particular to apply the flame-retardant composition in a solvent medium chosen in order to be compatible with the materials constituting the illuminating web. The term "compatible" is understood to mean that the solvent must not substantially damage the illuminating web, in particular that it must not substantially damage the optical properties of the illuminating web. This solvent evaporates during the drying of the structure at ambient temperature or by exposure to heating.

Thus, when the optical fibers of the textile web have a sheath made of plastic, for example made of poly(methyl methacrylate) (PMMA), the solvent is chosen so as to be compatible with this plastic.

The solvent is in particular water.

Advantageously, a flame-retardant composition having a viscosity between 10 and 7000 mPa·s, measured at ambient temperature by means of a Brookfield rheometer, is applied.

The flame-retardant composition preferably has a solids content representing between 5% and 95% of the total weight of the composition.

In a specific embodiment, the flame-retardant composition can be crosslinked under irradiation and, after the application stage, the illuminating structure is irradiated so as to crosslink the flame-retardant composition.

The irradiation can be carried out under ultraviolet radiation, under infrared radiation or by electron beam.

In another embodiment, after the application of the flame-retardant composition, in particular in the coating form, it is dried at ambient temperature or at a temperature lower than 100° C.

Another subject matter of the present invention is the use of an illuminating web as defined above or manufactured by the process as defined above as or as component of a painter's canvas or of a stretched fabric.

The present invention also relates to a painter's canvas or a fabric comprising an illuminating web as defined above or manufactured by the process as defined above.

The invention also relates to an illuminating web as described above, intended to be employed as or as component of a painter's canvas or of a stretched fabric, which can be used as wall or ceiling coating, added to a rigid or semirigid surface forming the wall or the ceiling. A painter's canvas is generally adhesively bonded to the wall surface to be coated. A stretched fabric is a fabric stretched and hung via a selvage onto the ceiling or stretched along a wall, if appropriate with mechanical attaching and tensioning means known per se.

A major field of application of the illuminating structure according to the invention lies in the field of the construction industry, in particular in the housing field.

The invention thus relates to the use of an illuminating structure as defined above or manufactured by a process as defined above as partition wall or wall lining or ceiling in a building.

The structure is appropriate to the standards in force as regards reaction toward fire and in particular to the European standard EN 13501.

Furthermore, the structure exhibits an advantageous illuminating performance and makes it possible to better illuminate the room in which it is placed and/or to consume less energy in order to provide a desired illumination, in particular in comparison with structures exhibiting nontransparent protection in front of the luminous fabric.

The structure also has good acoustic properties when it incorporates a support suitable for sound insulation.

In order to better illustrate the subject matter of the present invention, specific examples thereof will be described below with reference to the appended drawings.

The following examples illustrate the present invention without, further, limiting the scope thereof.

EXAMPLES

Example 1

Flame Propagation Test on a Support Made of Glass Wool

A sample of illuminating structure according to the invention was prepared in the form of a panel with dimensions of 1.5 cm by 10 cm. The support is an Ecophon wall panel based on glass wool with a thickness of 40 mm and a density of 55 kg/m$^3$.

An illuminating fabric formed of PMMA-sheathed optical fibers woven with glass fibers is adhesively bonded (Gludan 654 adhesive) to the support.

Two samples were prepared: a test sample, in which the illuminating fabric is covered on its front face with a flame-retardant varnish Char17 from Iris Vernici (200 g/m$^2$), and a non-flame-retarded control sample.

The flame propagation test consists in exposing each sample to the flame of a cigarette lighter for 10 seconds. After 40 seconds, the propagation of the flame on the sample is observed, as represented in FIG. 1.

Figure 1A:
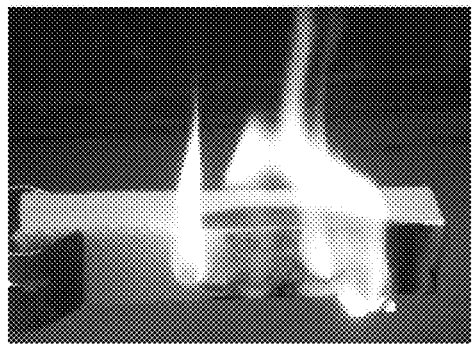
FIG. 1 represents a non-flame-retarded control illuminating structure (A) and an illuminating structure according to the invention (B) after a flame propagation test.
Figure 1B:
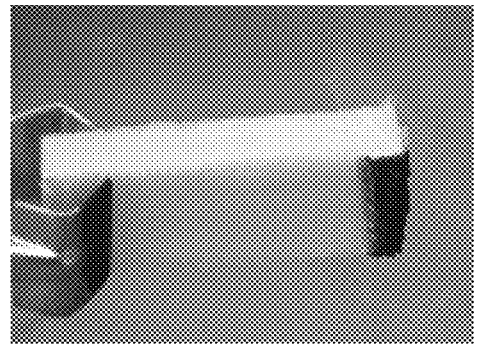

Without a flame-retardant coating, the control sample ignites after 10 seconds of exposure to the flame (FIG. 1A).

Combustion propagates rapidly at the surface of the sample and also penetrates in depth into the support made of glass wool.

By virtue of the flame-retardant coating, the sample according to the invention does not ignite (FIG. 1B), even when the duration of exposure to the flame is brought to 20 seconds.

The flame-retardant coating thus efficiently inhibits the combustion of the sample.

Example 2

Flame Propagation Test on a Support Made of Plaster

This example is carried out in a similar way to the preceding example, except that a support made of plaster with a thickness of 13 mm was used instead of a support made of glass wool.

Figure 2A:
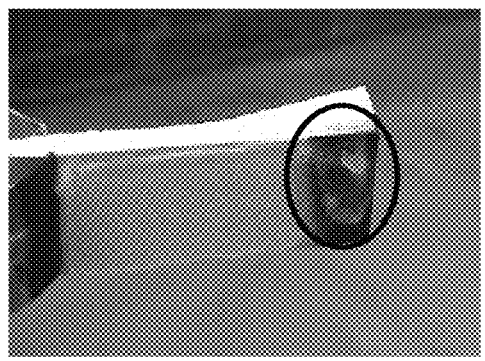
FIG. 2 represents a non-flame-retarded control illuminating structure (A) and an illuminating structure according to another embodiment of the invention (B) after a flame propagation test.

Each sample is exposed to the flame of a cigarette lighter for 10 seconds. After 40 seconds, the propagation of the flame on the sample is observed, as represented in FIG. 2.

The support made of plaster exhibits a better reaction toward fire than the support made of glass wool. Without a flame-retardant coating, combustion is thus weaker than for the samples comprising a support made of glass wool. The control sample made of non-flame-retarded plaster nevertheless ignites after 10 seconds of exposure to the flame, as is shown by the presence of a residual flame (circled region, FIG. 2A).

Figure 2B:
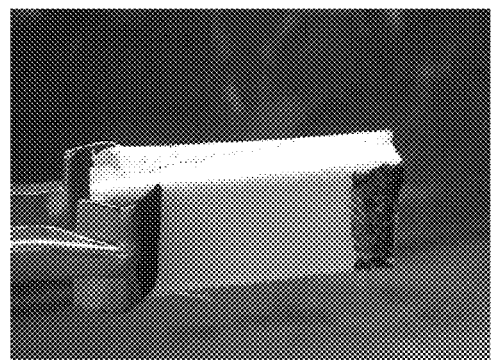

As in the preceding example, the effect of the flame-retardant coating is clear and is reflected by the absence of combustion of the sample according to the invention (FIG. 2B).

Example 3

Cone Calorimeter Test on a Support Made Mineral Wool

The test is carried out on 10×10 cm samples consisting of a support based on glass wool, with a thickness of 40 mm and a density of 55 kg/m$^3$, to which a thickness of illuminating fabric, formed of PMMA-sheathed optical fibers woven with glass/silicone fibers, is adhesively bonded (Gludan 654 adhesive, 200 g/m$^2$).

Samples 1 to 5 comprise a support made of mineral wool.

Comparative sample 1 does not exhibit any coating on the illuminating fabric or any additive in the adhesive.

Comparative sample 2 does not exhibit any coating on the illuminating fabric and comprises an Al(OH)$_3$ inorganic filler in the adhesive (20% by weight, with respect to the total weight of the adhesive).

Sample 3 is coated with a transparent flame-retardant varnish of Char17 (200 g/m$^2$) on the free face of the illuminating fabric.

Sample 4 is coated with a transparent flame-retardant varnish of Char17 (200 g/m$^2$) on the free face of the illuminating fabric and comprises an Al(OH)$_3$ inorganic filler in the adhesive (20% by weight, with respect to the total weight of the adhesive).

Sample 5 is coated with a transparent flame-retardant varnish of Char17 (200 g/m$^2$) on the free face of the illuminating fabric and with a flame-retardant paint S707-60 available from Nullifire, 140 g/m$^2$) on the face of the illuminating fabric in contact with the mineral wool support.

Each sample is placed in a cone calorimeter and is subjected to a 50 kW/m$^2$ radiant heat source. The measurement method corresponds to the ISO 5660-1 and ISO 5660-2 standards. The release of heat is measured as a function of the time, which makes it possible to obtain the peak value of the release of heat. The ignition time of the sample, starting from the beginning of the application of heat, is also measured.

The peak heat emission value and the ignition time for each sample are presented in table 1.

TABLE 1

| | Sample | | | | |
|---|---|---|---|---|---|
| | 1 (comp) | 2 (comp) | 3 | 4 | 5 |
| Peak heat emission, kW/m$^2$ | 251 | 261 | 226 | 162 | 75 |
| Ignition time (s) | 10 | 10 | 10 | 20 | 56 |

The illuminating structures according to the invention thus exhibit a reduced peak heat emission and, for some of them, reduced ignition times during the cone calorimeter test.

The use of an inorganic filler in the adhesive does not have a significant effect on the emission of heat when it is not combined with a coating of Char17 (sample 2).

On the other hand, the combination of an inorganic filler in the adhesive and of the coating of Char17 on the front face of the luminous fabric has, surprisingly, a synergistic effect both on the emission of heat and on the ignition time of the sample (sample 4).

The combination of two coatings, of the flame-retardant varnish on the front (free) face and of the flame-retardant paint on the back face of the luminous fabric, also, surprisingly, has a synergistic effect on the emission of heat and on the ignition time of the sample (sample 5).

Example 4

Cone Calorimeter Test on a Support Made of Plaster

Samples 6 to 8 have the same base structure as samples 1, 3 and 5, except that the support is a plasterboard with a thickness of 13 mm.

Sample 6 does not exhibit any coating on the illuminating fabric or any additive in the adhesive.

Sample 7 is coated with a transparent flame-retardant varnish of Char17 (200 g/m$^2$) on the free face of the illuminating fabric.

Sample 8 is coated with a transparent flame-retardant varnish of Char17 (200 g/m$^2$) on the free face of the illuminating fabric and with a flame-retardant paint S707-60 available from Nullifire, 140 g/m$^2$) on the back face of the illuminating fabric in contact with the plaster support.

The samples are tested in a cone calorimeter under the same conditions as for the preceding example.

The peak heat release values for each sample are presented in table 2.

TABLE 2

| | Sample | | |
|---|---|---|---|
| | 6 (comp) | 7 | 8 |
| Peak heat release, kW/m² | 252 | 222 | 169 |

The illuminating structures according to the invention thus exhibit a reduced peak heat emission.

The combination of two coatings, of the flame-retardant varnish on the front face and of the flame-retardant paint on the back face of the luminous fabric, also, surprisingly, has a synergistic effect on the emission of heat of the sample (sample 8).

The combination of two coatings, of the flame-retardant varnish on the front face and of the flame-retardant paint on the back face of the luminous fabric, also, surprisingly, has a synergistic effect on the emission of heat of the sample (sample 8).

Example 5

SBI Test (NF EN 13823 Standard) on a Support Made of Mineral Wool

Comparative example 9 does not exhibit any coating on the illuminating fabric or any additive in the adhesive.

Sample 10 is coated with a transparent flame-retardant varnish of Char17 (250 g/m²) on the free face of the illuminating fabric.

Sample 11 is coated with a transparent flame-retardant varnish of Char17 (250 g/m²) on the free face of the illuminating fabric and with a flame-retardant paint S707-60 available from Nullifire, 100 g/m² on the face of the illuminating fabric in contact with the mineral wool support.

TABLE 3

| | Sample | | |
|---|---|---|---|
| | 9 (comp) | 10 | 11 |
| FIGRA, W/s | 3354 | 68 | 38 |
| Euroclass classification | E | B | B |

Example 6

SBI Test (NF EN 13823 Standard) on a Support Made of Plaster

Comparative sample 12 does not exhibit any coating on the illuminating fabric or any additive in the adhesive.

Sample 13 is coated with a transparent flame-retardant varnish of FX100 (176 g/m²) on the free face of the illuminating fabric.

TABLE 4

| | Sample | |
|---|---|---|
| | 9 (comp) | 10 |
| FIGRA, W/s | 806 | 32 |
| Euroclass classification | E | B |

The invention claimed is:

1. An illuminating web, comprising a web and a flame-retardant composition impregnated into a bulk of the web and/or coated in a coating on at least one face of the web as one or more layers of a flame-retardant varnish.

2. The illuminating web as claimed in claim 1, wherein the web is a textile web comprising warp- and/or weft-woven optical fibers capable of emitting light laterally with respect to a longitudinal axis of the fibers.

3. The illuminating web as claimed in claim 1, wherein the flame-retardant composition is coated in a flame-retardant coating on at least one face of the web, in a form of one or more layers of flame-retardant varnish.

4. The illuminating web as claimed in claim 3, wherein the flame-retardant composition is present in an amount of from 100 to 350 g/m².

5. The illuminating web as claimed in claim 1, wherein the flame-retardant composition does not significantly damage emission of an illuminating surface.

6. The illuminating web as claimed in claim 5, wherein a loss of luminance of the illuminating web due to the composition, measured at the normal with respect to an emitting surface, is less than 30%.

7. The illuminating web as claimed in claim 1, wherein the flame-retardant composition comprises at least one flame-retardant agent selected from the group consisting of phosphorus-comprising compounds, halogen-comprising compounds, and inorganic fillers.

8. The illuminating web as claimed in claim 1, wherein the flame-retardant composition is intumescent.

9. The illuminating web as claimed in claim 1, wherein the flame-retardant composition comprises aluminum particles.

10. An illuminating structure comprising the illuminating web of claim 1 added to a rigid or semirigid support, said illuminating web comprising the web and a flame-retardant composition impregnated into the bulk of the web and/or coated in a coating on a free face of the web.

11. The illuminating structure as claimed in claim 10, comprising an interpolated flame-retardant coating interposed between the illuminating web and the rigid or semirigid support.

12. The illuminating structure as claimed in claim 11, wherein the interpolated flame-retardant coating is obtained by a process comprising applying a layer of paint or varnish on a face of the web facing the rigid or semirigid support.

13. The illuminating structure as claimed in claim 11, wherein the web is an interpolated textile web, woven or nonwoven, interposed between the illuminating web and the rigid or semirigid support and wherein the interpolated flame-retardant coating has been applied to a face of the interpolated textile web.

14. The illuminating structure as claimed in claim 11, wherein the interpolated flame-retardant coating is one or more layers of flame-retardant paint.

15. The illuminating structure as claimed in claim 11, wherein the interpolated flame-retardant coating has an albedo greater than 80.

16. The illuminating structure as claimed in claim 11, wherein the interpolated flame-retardant coating is present in an amount of from 50 to 300 g/m².

17. The illuminating structure as claimed in claim 11, wherein the interpolated flame-retardant coating comprises at least one flame-retardant agent selected from the group consisting of phosphorus-comprising compounds, halogen-comprising compounds, and inorganic fillers.

18. The illuminating structure as claimed in claim 11, wherein the interpolated flame-retardant coating is intumescent.

19. The illuminating structure as claimed in claim 10, wherein the illuminating web is attached directly or indirectly to the rigid or semirigid support via an adhesive based on a compound selected from the group consisting of silicates, silicone, polyester, or poly(vinyl acetate).

20. The illuminating structure as claimed in claim 10, wherein the illuminating web is attached directly or indirectly to the rigid or semirigid support via an adhesive comprising a flame-retardant agent.

21. The illuminating structure of claim 10, comprising aluminum particles.

22. A process manufacturing the illuminating web as claimed in claim 1, the process comprising:
   applying a flame-retardant composition into the bulk and/or onto at least one face of the web thereby obtaining the flame-retarded illuminating web.

23. The process as claimed in claim 22, comprising applying the flame-retardant composition in a solvent medium compatible with materials constituting the web.

24. The process as claimed in claim 22, comprising applying a flame-retardant composition having a viscosity between 10 and 7000 mPa·s, measured at ambient temperature.

25. The process as claimed in claim 22, further comprising:
   after the applying, irradiating the illuminating web, thereby crosslinking the flame-retardant composition.

26. A method of manufacturing a painter's canvas or a stretched fabric, the method comprising:
   manufacturing the painter's canvas or stretched fabric with the illuminating web of claim 1.

27. A painter's canvas or stretched fabric, comprising the illuminating web of claim 1.

28. A partition wall or wall lining or ceiling in a building comprising the illuminating structure of claim 10.

* * * * *